United States Patent [19]
England

[11] 3,723,470
[45] Mar. 27, 1973

[54] 3,4-DIFLUORO-α-PYRONES HAVING A 6-AROMATIC SUBSTITUENT

[75] Inventor: David Charles England, Wilmington, Del.

[73] Assignee: E. I. du Pont de Nemours and Company, Wilmington, Del.

[22] Filed: Aug. 31, 1970

[21] Appl. No.: 68,495

[52] U.S. Cl. ............260/343.5, 252/301.2, 424/279, 260/544 F, 260/649 F
[51] Int. Cl. .................................................C07d 7/16
[58] Field of Search..................................260/343.5

[56] References Cited

UNITED STATES PATENTS 3,351,653   11/1967   Carr et al. ..........................260/343.5

Primary Examiner—Alex Mazel
Assistant Examiner—Anne Marie T. Tighe
Attorney—James A. Costello

[57] ABSTRACT

Disclosed herein are pyrones of the formula

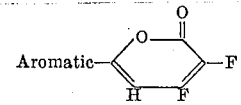

wherein the aromatic radical has six to 12 ring carbons, is attached by nuclear carbon to the 6-position and has up to five halogen, nitro, halo-lower alkyl, lower alkyl, or lower alkoxy substituents. Also disclosed is a process for making the compounds and their usefulness in inhibiting both yeast and mold fungi.

16 Claims, No Drawings

3,4-DIFLUORO-α-PYRONES HAVING A 6-AROMATIC SUBSTITUENT

BACKGROUND OF THE INVENTION

1. Field of the Invention

This invention is concerned with novel pyrones that inhibit both yeast and mold fungi.

2. Description of the Prior Art

Pyrones as a class of compounds, of course, are known. However, the particular compounds disclosed herein were heretofore unknown. Nothing in the art suggests the novel compounds, the process for making them, or their use as fungicides.

SUMMARY OF THE INVENTION

The novel compounds of this invention are 3,4-difluoro-α-pyrones of the formula

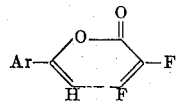

wherein Ar is an aromatic radical of six to 12 ring carbons, is attached by nuclear carbon to the 6-position of the pyrone ring and has up to five halogen, nitro, halo-lower alkyl, lower alkyl, or lower alkoxy substituents.

The preferred compounds are those wherein the aromatic radical has up to three substituents and any lower alkyl or alkoxy substituents have less than four carbons.

The new compounds are obtained by reacting an aromatic acetylene with perfluoroacrylyl fluoride followed by hydrolysis.

DESCRIPTION OF THE PREFERRED EMBODIMENTS

The novel compounds are obtained according to the following reaction:

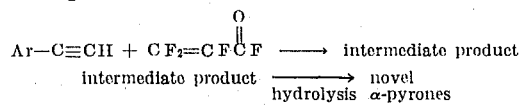

The hydrolysis reaction proceeds in an aqueous medium, preferably one which is mildly basic. An aqueous sodium bicarbonate medium is perfectly acceptable.

Preferred reaction temperatures are 125°–175°C. Although the reaction will proceed at temperatures below 100°C., better rates are obtained above 100°C. Since the reactants are volatile at these elevated temperatures, closed systems are employed.

The substituted aromatic acetylenes that are reacted with the perfluoroacrylyl fluoride have substituents selected from the group consisting of halogen, nitro, halo-lower alkyl, lower alkyl or lower alkoxy. The perfluoroacrylyl fluoride is a known compound and reference thereto can be found, for instance, in Tarrant, J. Org. Chem., 28, 1728–1730, (1963).

Numerous aromatic acetylenes are useful in the process taught herein. Such acetylenes include those that have one ring, two rings or a fused ring. In the first column of Table I are listed some of the substituted aryl acetylenes that react with perfluoroacrylyl fluoride to give the novel 3,4-difluoro-α-pyrones which are listed in the second column. The difluoropyrones in the second column are novel, are useful in inhibiting fungus growth and are included within the scope of this invention.

TABLE I

| Substituted aryl acetylenes | Novel difluoro pyrones |
| --- | --- |
| Phenylacetylene | 3,4-difluoro-6-(phenyl)-α-pyrone. |
| o-Nitrophenylacetylene | 3,4-difluoro-6-(o-nitrophenyl)-α-pyrone. |
| m-Nitrophenylacetylene | 3,4-difluoro-6-(m-nitrophenyl)-α-pyrone. |
| p-Nitrophenylacetylene | 3,4-difluoro-6-(p-nitrophenyl)-α-pyrone. |
| o-Tolylacetylene | 3,4-difluoro-6-(o-tolyl)-α-pyrone. |
| m-Tolylacetylene | 3,4-difluoro-6-(m-tolyl)-α-pyrone. |
| p-Tolylacetylene | 3,4-difluoro-6-(p-tolyl)-α-pyrone. |
| p-Anisylacetylene | 3,4-difluoro-6-(p-anisyl)-α-pyrone. |
| o-Chlorophenylacetylene | 3,4-difluoro-6-(o-chlorophenyl)-α-pyrone. |
| m-Chlorophenylacetylene | 3,4-difluoro-6-(m-chlorophenyl)-α-pyrone. |
| p-Chlorophenylacetylene | 3,4-difluoro-6-(p-chlorophenyl)-α-pyrone. |
| o-Bromophenylacetylene | 3,4-difluoro-6-(o-bromophenyl)-α-pyrone. |
| m-Bromophenylacetylene | 3,4-difluoro-6-(m-bromophenyl)-α-pyrone. |
| p-Bromophenylacetylene | 3,4-difluoro-6-(p-bromophenyl)-α-pyrone. |
| o-Iodophenylacetylene | 3,4-difluoro-6-(o-iodophenyl)-α-pyrone. |
| p-Iodophenylacetylene | 3,4-difluoro-6-(p-iodophenyl)-α-pyrone. |
| o-Fluorophenylacetylene | 3,4-difluoro-6-(o-fluorophenyl)-α-pyrone. |
| m-Fluorophenylacetylene | 3,4-difluoro-6-(m-fluorophenyl)-α-pyrone. |
| p-Fluorophenylacetylene | 3,4-difluoro-6-(p-fluorophenyl)-α-pyrone. |
| 2,6-dichlorophenylacetylene | 3,4-difluoro-6-(2',6'-dichlorophenyl)-α-pyrone. |
| 2,3,4,5,6-pentafluorophenylacetylene | 3,4-difluoro-6-(2',3',4',5',6'-pentafluorophenyl)-α-pyrone. |
| p-Isopropylphenylacetylene | 3,4-difluoro-6-(p-isopropylphenyl)-α-pyrone. |
| p-Ethylphenylacetylene | 3,4-difluoro-6-(p-ethylphenyl)-α-pyrone. |
| 3,4-dimethoxyphenylacetylene | 3,4-difluoro-6-(3,4-dimethoxyphenyl)-α-pyrone. |
| 2,4-dimethylphenylacetylene | 3,4-difluoro-6-(2,4-dimethylphenyl)-α-pyrone. |
| 2,4,6-trimethyl-3-bromophenylacetylene | 3,4-difluoro-6-(2,4,6-trimethyl-3-bromophenyl)-α-pyrone. |
| 2,3,4,6-tetramethylphenylacetylene | 3,4-difluoro-6-(2,3,4,6-tetramethylphenyl)-α-pyrone. |
| 5-chloro-2-nitrophenylacetylene | 3,4-difluoro-6-(5-chloro-2-nitrophenyl)-α-pyrone. |
| 5-bromo-2-nitrophenylacetylene | 3,4-difluoro-6-(5-bromo-2-nitrophenyl)-α-pyrone. |
| 4-phenylphenylacetylene | 3,4-difluoro-6-(4-phenylphenyl)-α-pyrone. |
| o-Trifluoromethylphenylacetylene | 3,4-difluoro-6-(o-trifluoromethylphenyl)-α-pyrone. |
| m-Trifluoromethylphenylacetylene | 3,4-difluoro-6-(m-trifluoromethylphenyl)-α-pyrone. |
| p-Trifluoromethylphenylacetylene | 3,4-difluoro-6-(p-trifluoromethylphenyl)-α-pyrone. |

SPECIFIC EMBODIMENTS

The following Examples are provided to illustrate the invention and they should not be deemed to limit the invention. All temperatures are in degrees centigrade.

EXAMPLE 1

3,4-Difluoro-6-phenyl-α-pyrone

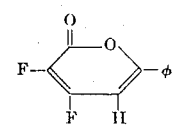

A mixture of 20 g (0.2 m) of phenylacetylene and 18 ml (0.2 mole) of perfluoroacrylyl fluoride in a sealed tube was heated in a steam bath for 48 hrs. Distillation of the black reaction mixture yielded 8 g of low-boiling material and 22.4 g (49 percent) of material boiling at 56°–66°C. (0.5 mm). The latter was a mixture of

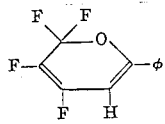

(2,2,3,4 tetrafluoro-6-phenyl-α-pyran) and

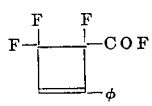

(1-phenyl-3,4,4-trifluoro-1-phenylcyclobutenyl-4-carbonyl fluoride) in a ratio of 2 to 1 (the pyran was concentrated in higher boiling fractions). A later fraction contained 2 g of 1,2-difluoro-4,5-diphenylbenzene,

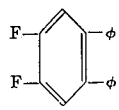

Five g of the mixture was stirred in 25 ml of 10% aq $NaHCO_3$. Filtration gave 3.4 g of (3,4-difluoro-6-phenyl-α-pyrone). Recrystallization from $CCl_4$ gave 2.1 g of the purified pyrone.
Anal.
ir: 5.80 μ (C=O), 6.02, 6.29, 6.35, 6.68 μ (aromatic and conjugated C=C).
H' nmr: phenyl multiplet (centered) at 2.9τ; singlet proton doublet (J = 5 cps) to doublets (J = 9 cps) 3.42τ. $F^{19}$ nmr: a doublet to doublets (wt 1) J = 16, 5 cps at 167.6 ppm; doublet to doublets (wt 1) J = 16, 9 cps at 121.8 ppm.
Anal. Calcd. for $C_{11}H_6F_2O_2$: C, 63.51; H, 2.91; F, 18.27
Found; C, 63.44; H, 3.01; F, 18.13

EXAMPLE 2

3,4-Difluoro-6-(p-chlorophenyl)-α-pyrone

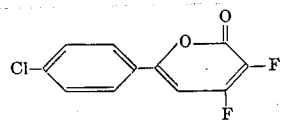

A mixture of 13.6 g (0.1 m) of p-chlorophenylacetylene and 15.3 g (0.12 m) of perfluoroacrylyl was heated in a Carius tube to 140° for 3 hrs. After removal of 5 g of unreacted perfluoroacrylyl fluoride, the black residue was distilled yielding 6.0 g of black liquid, bp 74°–82° (0.7 mm). The distillate was stirred with 30 ml of 10% aq $NaHCO_3$. Filtration gave 2.85 g of material which in cyclohexane/benzene was then passed through 100 g of basic (Activity III) Woehlm alumina: Fraction 1 cyclohexane 0.09 g; Fraction 2 25 percent of benzene, 75 percent cyclohexane 0.89 g. Sublimation of Fraction 2 at 120° (0.25 mm) yielded 0.45 g (2 percent) of 3,4-difluoro-6-(p-chlorophenyl)-α-pyrone, mp 123–125°C.
Anal.
Calcd. for $C_{11}H_5O_2F_2Cl$: C, 54.47; H, 2.07; Cl, 14.61; F, 15.66

Found: C, 54.16; H, 2.34; Cl 14.94; 54.55 2.24 15.11
F, 15.48 15.43
H' nmr ($CDCl_3$/TMS): quartet centered at 7.72 δ (wt 4);
quartet (J = 5, 9 cps) centered at 6.74 δ (wt 1); hydration peak, 1.3 cps.
$F^{19}$ nmr ($CDCl_3/F_{11}$); doublet to doublet (J = 9, 16 cps),
118 ppm (wt 1); doublet to doublet (J = 5, 16 cps), 164 ppm (wt 1).

EXAMPLE 3

3,4-Difluoro-6-(p-bromophenyl)-α-pyrone,

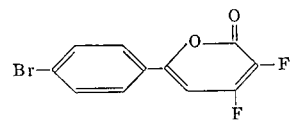

p-Bromophenylacetylene (18.1 g, 0.1 mole) and perfluoroacrylyl fluoride (15.3 g, 0.12 mole) were heated in a Carius tube to 150° for 3 hrs. Perfluoroacrylyl fluoride (9.3 g, 0.53 mole) was recovered by distillation. Sublimation of the remaining tar at 100° (0.25 mm) yielded 4.3 g of semisolid. This was stirred in 25 ml of 10 percent sodium bicarbonate. Filtration gave 3.55 g of 3,4-difluoro-6-(p-bromophenyl)-α-pyrone which when recrystallized from 50 ml carbon tetrachloride gave 1.58 g (5 percent) of crystals, mp 130.5°–137°
Anal.
Calcd. for $C_{11}H_5O_2F_2Br$; C, 46.02; H, 1.75; F, 13.23
Found: C, 46.85; H, 2.04; F, 12.05
H' nmr (($CCD_3)_2Co$/TMS): multiplet superimposed on a doublet centered at 7.62 δ.
$F^{19}$ nmr (($CD_3)_2Co/F_{11}$): doublet to doublet (J = 9, 16 cps) at 164 ppm (wt 1); doublet to doublet (J = 5, 16 cps) at 123 ppm (wt 1).

EXAMPLE 4

3,4-Difluoro-6-(p-tolyl)-α-pyrone

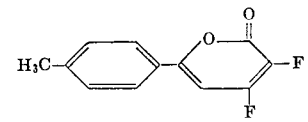

p-Tolyacetylene (11.6 g, 0.1 mole) and perfluoroacrylyl fluoride (15.3 g. 0.12 mole) were heated in a sealed tube on a steam bath for 12 hours. After removal of 6.0 g of unreacted perfluoroacrylyl fluoride, there was distilled 8.8 g of a yellow-black semi-solid. This was stirred into 50 ml of 10 percent sodium bicarbonate. The insoluble portion, collected by filtration, sublimed at 90°C (0.1 mm), was recrystallized twice from benzene, and dried in vacuo over $P_2O_5$, to give 4.3 g (10 percent) white crystals of 3,4-difluoro-6-(p-tolyl)-α-pyrone, mp 106°–107°.
Anal. Calcd. for $C_{12}H_8O_2F_2$: C, 64.86; H, 3.63; F, 17.11
Found: C, 65.28; H, 3.85; F, 17.54
H' nmr (($CD_3)_2CO$/TMS): quadruplet, 7.27, 7.40, 7.71, 7.85 δ (wt 4); pair of doublets (J = 4, 9 cps) centered at 7.05 δ (wt 1); methyl singlet, 2.37δ (wt 3); hydration peak, 2.08δ (wt 1).

$F^{19}$ nmr (($CO_3$)$_2$CO/$F_{11}$): doublets to doublets (J = 9, 17 cps) centered at 125 ppm (wt 1).
ir: CH–3400 $cm^{-1}$; CO–1740 $cm^{-1}$.

EXAMPLE 5

3,4-Difluoro-6-(p-anisyl)-α-pyrone.

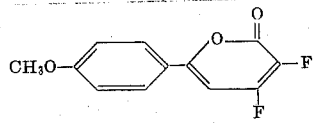

A mixture of 10.1 g (0.75 m) of p-anisylacetylene and 12.8 g (1.0 m) of perfluoroacrylyl fluoride were heated to 140° for 4 hrs. After removal of low-boilers at room temperature, the black tarry residue was dissolved in saturated $NaHCO_3$ solution and warmed on the steam bath. This solution was extracted with ether. The tar remaining upon distillation of the ether was chromatographed on 300 g of acid Woehlm alumina (Activity III) with 250 ml portions of 50 percent cyclohexanebenzene. Fractions 8 and 9 contained 1.50 g of yellow crystals. Upon recrystallization from $CHCl_3$, pale yellow crystals of 3,4-difluoro-6-(p-anisyl)-α-pyrone, mp 134.5°–135.5° were obtained.
Anal.
Calcd. for $C_{12}H_8O_3F_2$: C, 60.51; H, 3.39

Found:  C, 60.56;  H, 3.54
        60.57      3.41

H' nmr ($CDCl_3$/TMS): singlet (wt 3) 3.98; quartet (wt 4) 6.94, 7.09, 7.68, 7.83 δ; quartet (wt 1) centered at 6.54 δ.
ir: 1730 $cm^{-1}$, 1670 $cm^{-1}$, 1500 $cm^{-1}$.

EXAMPLE 6

3,4-Difluoro-6-(2,4-dimethylphenyl)-α-pyrone.

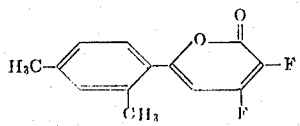

A mixture of 20.49 g (0.16 m) of 75 percent 2,4-dimethylphenylacetylene and 20.25 g (0.16 m) of perfluoroacrylyl fluoride was heated in a steam bath for 48 hrs. Distillation at 88° (0.9 mm) yielded a clear yellow liquid. This was stirred with excess saturated $NaHCO_3$ solution. The mixture was extracted with $CHCl_3$. After drying over $MgSO_4$, the $CHCl_3$ solution was evaporated to dryness. The pale yellow crystals of 3,4-difluoro-6-(2,4-dimethylphenyl)-α-pyrone upon recrystallization from cyclohexane weighed 8.5 g and melted at 83°–84.5°.

Anal. Calcd. for $C_{13}H_{10}F_2O_2$: C, 66.11; H, 4.27

Found:  C, 66.50;  H, 4.44
        66.13      4.25 ir: C=O 1725, 1760 $cm^{-1}$

H' nmr ($CDCl_3$/TMS): aromatic (wt 4); vinyl quartet (wt 1); two $CH_3$ singlets (total wt 6).

UTILITY

The effectiveness of selected novel compounds as antifungal agents against phycomycetes, ascomycetes, basidiomycetes and fungi imperfecti is shown in Table II. These compounds inhibit the growth of both yeast and mold fungi including those that affect plants and warm-blooded animals. In addition to their use as fungicides, the novel compounds herein are fluorescent and are useful for applications requiring fluorescing agents.

Studies of fungicidal activity were conducted on the novel compounds made according to Examples 1 to 6. As expected, effectiveness varies depending on the compound being tested and on the genus and species of fungus being treated and controlled. Despite a variation in effectiveness, all of the novel compounds of Table I are effective against one or more of the fungi listed in Table II.

Because of their superior effectiveness the preferred compounds of this invention are the products of Examples 1, 2 and 4: 3,4-difluoro-6-(phenyl)-α-pyrone, 3,4-difluoro-6-(p-chlorophenyl)-α-pyrone, and 3,4-difluoro-6-(p-tolyl)-α-pyrone.

Table II shows the minimum concentrations, in micrograms/milliliter, of the novel compounds of Examples 1 to 6 in a culture medium, that effectively inhibit fungus growth after incubation for 72 hours at 25°C. The tests were conducted at concentrations of 0, 0.01, 0.03, 0.1, 0.3, 1, 3, 10, 30, 100 and 1,000 micrograms per milliliter in a potato dextrose medium with absence of turbidity after incubation showing inhibition.

TABLE II
In vitro activity of selected α-pyrones

| Ex. | Physo-mycetes (a)* | Ascomycetes (8 species) | | | | | | | | Basidio-mycetes (j) | Fungi imperfecti (7 species) | | | | | | |
|---|---|---|---|---|---|---|---|---|---|---|---|---|---|---|---|---|---|
| | | (b) | (c) | (d) | (e) | (f) | (g) | (h) | (i) | | (k) | (l) | (m) | (n) | (o) | (p) | (q) |
| 1 | 3 | 10 | 10 | 1 | 3 | 3 | 0.3 | 1 | 3 | 10 | 1 | 1 | 3 | 3 | 3 | 10 | 3 |
| 2 | 1 | 10 | 10 | 3 | 10 | 10 | 0.3 | 1 | 3 | 1 | 1 | 3 | 3 | 1 | 1 | 3 | 1 |
| 3 | 3 | 10 | 30 | 30 | 30 | 30 | 1 | 1 | 3 | 1 | 3 | 10 | 10 | 1 | 1 | 3 | 1 |
| 4 | 3 | 10 | 10 | 3 | 3 | 3 | 0.1 | 0.3 | 3 | 3 | 3 | 3 | 3 | 3 | 3 | 10 | 0.3 |
| 5 | 100 | 30 | >1,000 | >1,000 | >1,000 | >1,000 | 10 | 10 | 10 | 100 | 10 | 10 | 30 | 30 | 30 | 30 | 100 |
| 6 | 3 | 30 | >1,000 | >1,000 | >1,000 | >1,000 | 1 | 1 | 10 | 3 | 3 | 10 | 10 | 10 | 10 | 3 | |

*The particular species of fungi, referred to in this table by letter designation, are described more fully in Table III.

Table III shows the various species of fungi whose growth has been shown to be effectively inhibited by the novel compounds of this invention.

TABLE III

| | Fungus | ATCC* No. |
|---|---|---|
| (a) | Mucor azygospora | 15087 |
| (b) | Candida albicans | 11651 |
| (c) | Hansenula anomala | 580 |
| (d) | Rhodotorula glutinis | 4054 |
| (e) | Sporobolomycetes salmonicolor | 623 |
| (f) | Torulopsis colliculosa | 2507 |
| (g) | Glomerella cingulata | |
| (h) | Chaetomium globosum | 6205 |
| (i) | Memnoniella echinata | 11973 |
| (j) | Armillaria mellea | 11113 |
| (k) | Aspergillus fumigatus | |
| (l) | Aspergillus niger | |
| (m) | Aspergillus flavus | 9643 |
| (n) | Helminthosporium gramineum | 6695 |
| (o) | Penicillium notatum | |
| (p) | Penicillium ochraceum | |
| (q) | Botrytis allii | 9435 |

* American Type Culture Collection, Washington, D.C.

The embodiments of the invention in which an exclusive property or privilege is claimed are defined as follows:

1. A pyrone compound of the formula

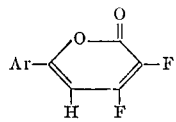

wherein Ar is selected from the group consisting of phenyl and biphenyl, is attached by nuclear carbon to the 6-position of the pyrone ring and has up to five substituents selected from halogen, nitro, trifluoromethyl, lower alkyl of less than four carbons, or lower alkoxy of less than four carbons.

2. A compound according to claim 1, wherein the aromatic radical has up to three substituents.

3. A compound according to claim 1, 3,4-difluoro-6-phenyl-α-pyrone.

4. A compound according to claim 1, 3,4-difluoro-6-(p-chlorophenyl)-α-pyrone.

5. A compound according to claim 1, 3,4-difluoro-6-(p-bromophenyl)-α-pyrone.

6. A compound according to claim 1, 3,4-difluoro-6-(p-tolyl)-α-pyrone.

7. A compound according to claim 1, 3,4-difluoro-6-(p-anisyl)-α-pyrone.

8. A compound according to claim 1, 3,4-difluoro-6-(2,4-dimethylphenyl)-α-pyrone.

9. A process for making a compound of claim 1, comprising reacting perfluoroacrylyl fluoride with a substituted aromatic acetylene, wherein the aromatic acetylene has up to five substitutents selected from the group consisting of
   halogen, nitro, trifluoromethyl, lower alkyl of less than four carbons, and lower alkoxy of less than four carbons,
thereby forming an intermediate 2,2,3,4 tetrafluoro-6-aromatic-α-pyran, and hydrolyzing the intermediate in an aqueous medium.

10. A process according to claim 9, wherein the reaction temperature is between 100° to 175°C.

11. A process according to claim 9, wherein the aromatic acetylene is phenylacetylene.

12. A process according to claim 9, wherein the aromatic acetylene is p-chlorophenylacetylene.

13. A process according to claim 9, wherein the aromatic acetylene is p-bromophenylacetylene.

14. A process according to claim 9, wherein the aromatic acetylene is p-tolylacetylene.

15. A process according to claim 9, wherein the aromatic acetylene is p-anisylacetylene.

16. A process according to claim 9, wherein the aromatic acetylene is 2,4-dimethylphenylacetylene.

* * * * *

PO-1050
(5/69)

UNITED STATES PATENT OFFICE

CERTIFICATE OF CORRECTION

Patent No. 3,723,470   Dated March 27, 1973

Inventor(s) David Charles England

It is certified that error appears in the above-identified patent and that said Letters Patent are hereby corrected as shown below:

Col. 1, Table I, entry 24, change "3,4-diamethoxyphenylacetylene" to -- 3,4-dimethoxyphenylacetylene --;

Col. 4, lines 1-2, change "Found: C,5416 ; H, 2.34; Cl 14.94; 54.55 2.24 15.11 F, 15.48 15.43" to -- Found: C, 54.16; H, 2.34; Cl, 14.94; F, 15.48 --;
54.55     2.24        15.11        15.43 same column, line 36, change "(($CCD_3$)$_2$Co/TMS)" to --($CD_3$)$_2$CO/TMS) --; and Col. 5, line 22, change "cyclohexanebenzene" to -- cyclohexane-benzene --.

Signed and sealed this 25th day of December 1973.

(SEAL)
Attest:

EDWARD M. FLETCHER, JR.
Attesting Officer

RENE D. TEGTMEYER
Acting Commissioner of Patents